United States Patent
Matsumoto

(10) Patent No.: US 12,230,296 B2
(45) Date of Patent: Feb. 18, 2025

(54) MAGNETIC RECORDING/REPRODUCING DEVICE

(71) Applicants: Kabushiki Kaisha Toshiba, Tokyo (JP); Toshiba Electronic Devices & Storage Corporation, Tokyo (JP)

(72) Inventor: Takuya Matsumoto, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/461,140

(22) Filed: Sep. 5, 2023

(65) Prior Publication Data

US 2024/0321293 A1  Sep. 26, 2024

(30) Foreign Application Priority Data

Mar. 20, 2023   (JP) ................. 2023-044459

(51) Int. Cl.
  *G11B 5/54*    (2006.01)
  *G11B 5/02*    (2006.01)
  *G11B 5/09*    (2006.01)
  *G11B 5/00*    (2006.01)

(52) U.S. Cl.
  CPC ........ *G11B 5/02* (2013.01); *G11B 2005/0024* (2013.01)

(58) Field of Classification Search
  CPC .. G06F 11/3452; G06F 3/0616; G06F 11/008; G06F 11/0727; G11B 13/08; G11B 5/4866; G11B 5/6088; G11B 7/16; G11B 2005/0021; G11B 5/012; G11B 5/54; G11B 5/59633; G11B 5/09
  USPC .............................................. 360/75, 59, 48
  See application file for complete search history.

(56) References Cited

U.S. PATENT DOCUMENTS

| | | | |
|---|---|---|---|
| 8,406,104 B1 | 3/2013 | Himi et al. | |
| 9,569,121 B1 | 2/2017 | Rausch et al. | |
| 10,026,420 B1 | 7/2018 | Rausch et al. | |
| 10,991,387 B1 | 4/2021 | Balasubramaniam et al. | |
| 11,023,352 B2 * | 6/2021 | Gaertner | G06F 3/0644 |
| 11,437,069 B2 * | 9/2022 | Matsumoto | G11B 33/1426 |
| 11,600,296 B1 * | 3/2023 | Gao | G11B 20/1217 |
| 2019/0227898 A1 | 7/2019 | Gaertner et al. | |

* cited by examiner

*Primary Examiner* — Nabil Z Hindi
(74) *Attorney, Agent, or Firm* — Kim & Stewart LLP

(57) ABSTRACT

A magnetic recording/reproducing device includes a magnetic recording medium, a plurality of assisted magnetic recording heads, and a processor configured to write data onto the magnetic recording medium according to a first type of magnetic recording or a second type of magnetic recording and select one of the assisted magnetic recording heads for recording based on at least one of assist power and application time of the assist power when assisted magnetic recording is performed.

16 Claims, 11 Drawing Sheets

MAGNETIC RECORDING/REPRODUCING DEVICE

CROSS-REFERENCE TO RELATED APPLICATION(S)

This application is based upon and claims the benefit of priority from Japanese Patent Application No. 2023-044459, filed Mar. 20, 2023, the entire contents of which are incorporated herein by reference.

FIELD

Embodiments described herein relate generally to a magnetic recording/reproducing device.

BACKGROUND

A magnetic head used in assisted magnetic recording, for example, a magnetic head equipped with a near-field optical element used in thermally-assisted magnetic recording, generates near-field light rays from a tip of an element by applying light rays from a laser diode, which is a light source, to the near-field optical element and locally heats a recording layer with high perpendicular magnetic anisotropy of a magnetic recording medium. Coercive force of the heated recording layer portion is sufficiently reduced during recording, so it is expected that high recording density will become possible.

On the other hand, heat is generated in the near-field optical element when generating near-field light rays, so damage to the near-field optical element is accumulated as a result of repeated recording, and eventually the recording layer cannot be heated sufficiently, such that recording becomes impossible and write operation lifetime becomes a major issue.

Therefore, recently, an algorithm technique for estimating a state of a recording head by monitoring laser application time, laser power, and a radial position during recording, that does not cause variations in an amount of use of a recording head, or the like has been disclosed. For example, techniques have been proposed to provide a step to migrate cold data sets to data recording positions with a poor operation lifetime index value, but they have a disadvantage of affecting data processing/response performance.

DETAILED DESCRIPTION

Figure 1:
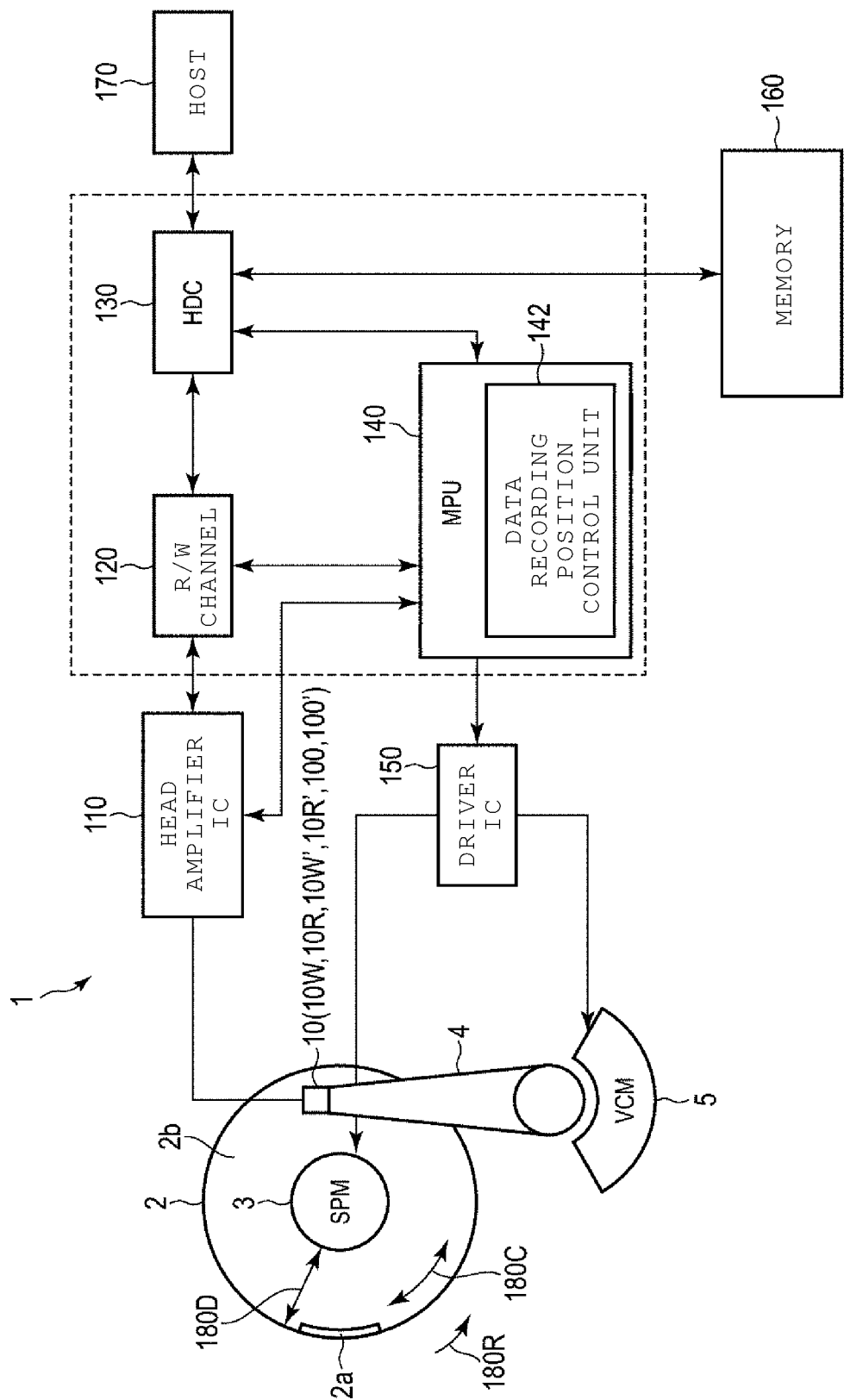
FIG. 1 is a block diagram illustrating a first magnetic recording/reproducing device according to an embodiment.

Embodiments prevent deterioration of lifetime of a magnetic recording/reproducing device due to write operation lifetime.

In general, according to one embodiment, a magnetic recording/reproducing device includes a magnetic recording medium, a plurality of assisted magnetic recording heads, and a processor configured to write data onto the magnetic recording medium according to a first type of magnetic recording or a second type of magnetic recording and select one of the assisted magnetic recording heads for recording based on at least one of assist power and application time of the assist power when assisted magnetic recording is performed.

A magnetic recording/reproducing device according to an embodiment includes a magnetic recording medium, an assisted magnetic recording head, and a processor configured to write data onto the magnetic recording medium in one of a plurality of areas according to a first type of magnetic recording or a second type of magnetic recording and select one of the areas for recording based on at least one of assist power and application time of the assist power when assisted magnetic recording is performed.

The assisted magnetic recording head used in the embodiment can be applied to either the first type of magnetic recording method or the second type of magnetic recording method. According to the embodiment, by selecting the head or recording area based on at least one of the assist power and the application time of the assist power when the assisted magnetic recording is performed by the first type of magnetic recording method or the second type of magnetic recording method, it is possible to reduce variations in an operation lifetime of the head or the medium and extend the lifetime of the magnetic recording/reproducing device.

Embodiments will be described below with reference to the drawings. The disclosure is merely an example, and appropriate modifications that can be easily conceived by those skilled in the art while keeping the gist of the present disclosure are naturally within the scope of the present disclosure. To make the description clearer, the drawings may schematically show the width, thickness, shape, and the like of each part compared to actual ones. These are only an example, and it is not intended to limit the scope of the present disclosure. In the specification and each figure, the same reference numerals may be given to the same elements as those described above with respect to the existing drawings, and detailed description thereof may be omitted as appropriate.

FIG. 1 is a block diagram illustrating an example of a control configuration of a magnetic disk device as a first magnetic recording/reproducing device according to an embodiment. As illustrated in FIG. 1, a magnetic disk device 1 includes a magnetic disk 2 as a magnetic recording medium, a spindle motor (SPM) 3 as a rotary drive unit, an actuator assembly 4, a voice coil motor (VCM) 5, and a magnetic head 10. The magnetic disk 2 is provided with a management area 2a for recording information for managing data to be recorded. A rotation direction of the magnetic disk 2 is counterclockwise as indicated by an arrow 180R, but the direction can be reversed.

The magnetic disk device 1 further includes a head amplifier IC 110, an R/W channel 120, a hard disk controller (HDC) 130, a microprocessor (MPU) 140, a driver IC 150, and a memory 160. The magnetic disk device 1 can be connected to a host computer (host) 170. The R/W channel 120, the HDC 130, and the MPU 140 may be incorporated in a one-chip integrated circuit.

The magnetic head 10 includes a write head 10W, a read head 10R, and an assist element 100. The write head 10W writes data to the magnetic disk 2. The read head 10R reads data from the magnetic disk 2. The assist element 100 may be a thermal assist element which assists in writing data when the write head 10W writes data to the magnetic disk 2. The magnetic head 10 may include a single magnetic head or a plurality of magnetic heads. The magnetic disk 2 may also include a single magnetic disk or a plurality of magnetic disks corresponding to the magnetic head.

The spindle motor 3 is driven by drive current (or drive voltage) supplied from the driver IC 150. Data patterns on the magnetic disk 2 are recorded and reproduced by the magnetic head 10. By operating a voice coil by the voice coil motor 5 and rotating the actuator assembly 4 from an unload position of a ramp loading mechanism (not illustrated), the magnetic head 10 is moved to a desired track on the magnetic disk 2 and positioned at a predetermined position on the magnetic disk 2. The voice coil motor 5 is driven by a drive current (or drive voltage) supplied from the driver IC 150.

The head amplifier IC 110 supplies a write signal (e.g., write current) corresponding to write data supplied from the R/W channel 120 to the write head 10W. Light output from the thermal assist element 100 is controlled. The head amplifier IC 110 amplifies the read signal output from the read head 10R and transmits the amplified signal to the R/W channel 120.

The R/W channel 120 is a signal processing circuit that processes signals related to read/write. The R/W channel 120 includes a read channel that performs signal processing on read data and a write channel that performs signal processing on write data. The read channel converts the read signal to digital data and demodulates the read data from the digital data. The write channel encodes write data transferred from the HDC 130 and transfers the encoded write data to the head amplifier IC 110.

The HDC 130 controls writing data to the magnetic disk 2 and reading data from the magnetic disk 2 via the magnetic head 10, the head amplifier IC 110, the R/W channel 120, and the MPU 140. The HDC 130 forms an interface between the magnetic disk device 1 and the host 170 and controls transfer of read data and write data. That is, the HDC 130 functions as a host interface controller that receives signals transferred from the host 170 and transfers signals to the host 170. The HDC 130 receives commands (e.g., write command, read command, and the like) transferred from the host 170 and transmits the received commands to the MPU 140.

The MPU 140 is a main controller of the magnetic disk device 1 and executes servo control and the like necessary for controlling read/write operations and positioning the magnetic head 10. The MPU 140 is programmed with instructions to function as a data recording position control unit 142 that controls a data recording position based on at least one of the assist power and the application time of the assist power when assisted magnetic recording is performed by the first magnetic recording method or the second magnetic recording method. In the assisted recording, assisted magnetic recording can be performed by the first magnetic recording method or the second magnetic recording method. The data recording position control unit 142 controls the data recording position based on at least one of the assist power and the application time of the assist power when the assisted magnetic recording is performed.

An assist power application time is an accumulated time of assist power application. The data recording position may be provided, for example, in one assisted magnetic recording head out of a plurality of assisted magnetic recording heads, or in a predetermined recording region (area) in the recording surface of the magnetic recording medium. A data recording position may be represented by a 3D address represented by three numerical values, for example, C (cylinder number), H (head number), and S (sector number). C may designate a track by determining the position in a radial direction indicated by an arrow 180D on a recording surface 2b of the magnetic disk 2. H may designate the recording surface of the magnetic recording medium by determining the head. S may designate an area in the recording surface by determining the position in a circumferential direction indicated by an arrow 180C on the recording surface 2b.

The area on the recording surface may be designated, for example, by a zone divided into a plurality of regions for each predetermined range in the radial direction, a band region by bundling a plurality of tracks in a zone, or by units of tracks or sectors. The driver IC 150 controls driving of the spindle motor 3 and the voice coil motor 5 under the control of the MPU 140. The magnetic head 10 is positioned on a target track on the magnetic disk 2 by driving the voice coil motor 5. The memory 160 includes a volatile memory and a non-volatile memory. For example, the memory 160 includes a buffer memory made up of DRAM and a flash memory.

Assisted recording using assist element includes, for example, thermally-assisted recording, microwave-assisted recording, and the like. In thermally-assisted recording, the assist element is a near-field optical element (referred to herein as a thermal assist element), and may further include a laser light source that outputs laser light rays to the near-field optical element. In microwave-assisted recording, the assist element is a spin torque element (referred to herein as a microwave assist element) that oscillates spin torque.

Here, the assist power is generated according to the intensity of light rays applied to a recording layer in thermally-assisted recording, and the intensity of microwaves applied to the recording layer in microwave-assisted recording. In thermally-assisted recording, the assist power may be controlled by controlling current or voltage applied from a power source to the laser light source that outputs light rays to the near-field optical element. In microwave-assisted recording, the assist power may be controlled by controlling current or voltage applied from the power source to the spin torque element.

Examples of the first magnetic recording method and the second magnetic recording method include a general recording method in which tracks are written at intervals in the radial direction and recording is performed so that adjacent tracks do not overlap, so-called conventional magnetic recording (CMR), a shingled recording method in which tracks are stacked in order in the radial direction and recording is performed in overlapping parts of the adjacent tracks, so-called shingled magnetic recording (SMR), and an interlaced recording method in which adjacent tracks have a bottom track and a top track that are alternately overlapped, and after recording on the bottom track, recording is performed by overlapping the interlaced top track on the bottom track, so-called interlaced magnetic recording (IMR).

Figure 2:
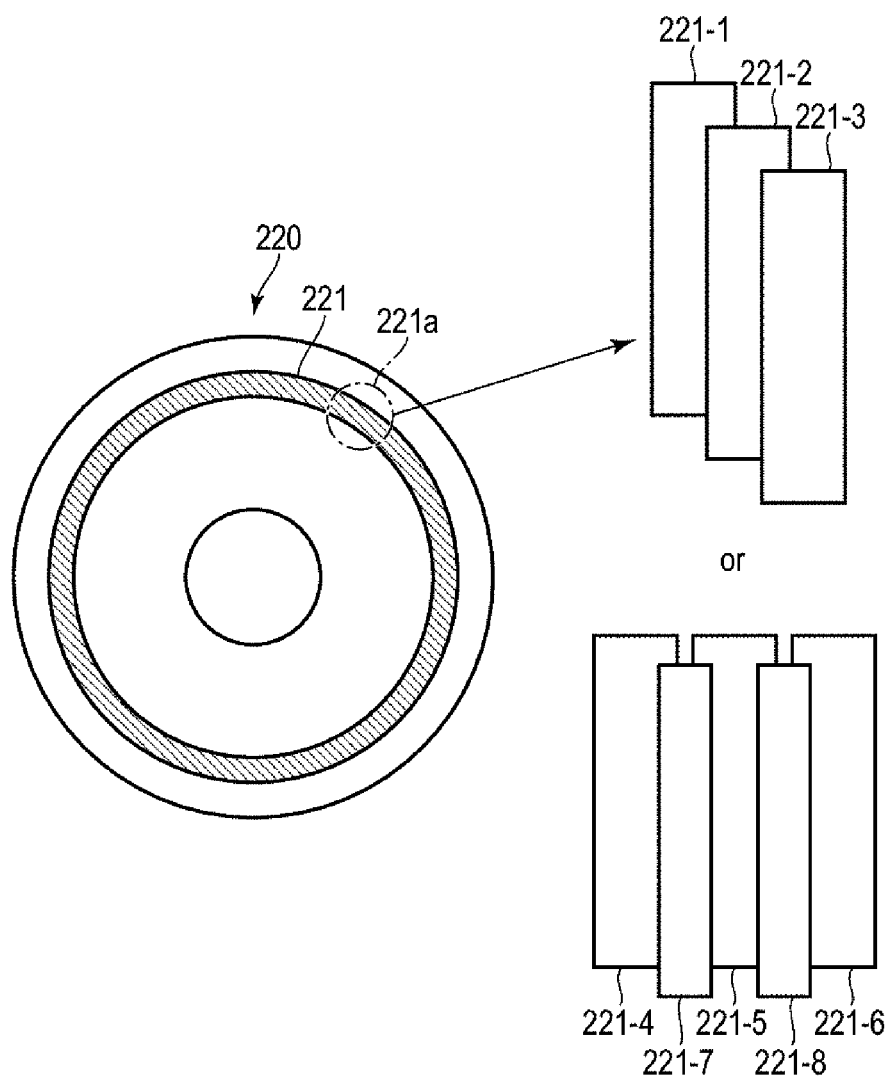
FIG. 2 is a diagram illustrating an example of a shingled recording method of a magnetic disk for thermally-assisted magnetic recording.

For example, the general recording method may be set as the first magnetic recording method, and the shingled recording method or the interlace recording method may be set as the second magnetic recording method. FIG. 2 illustrates a diagram showing an example of the shingled recording method. The assisted magnetic recording/reproducing device can be set to perform recording using the shingled recording method in which recording is performed in overlapping parts of the adjacent tracks. When recording is performed by the shingled recording method, in terms of the size of the region recorded by the shingled recording method, the recording surface of the magnetic disk for thermally-assisted magnetic recording can be made larger than the recording surface of the magnetic disk for perpendicular magnetic recording.

In FIG. 2, tracks 221-1, 221-2, and 221-3 represent adjacent tracks in a region 221a in a plurality of tracks 221 of an assisted magnetic recording magnetic disk 220. As illustrated in the drawing, the assisted magnetic recording magnetic disk 220 is set to perform recording by the SMR method in which recording is performed in overlapping parts of tracks such as the adjacent tracks 221-1, 221-2, and 221-3. In the SMR method, although the adjacent tracks 221-1, 221-2, and 221-3 overlap in order, instead of the tracks 221-1, 221-2, and 221-3, the IMR method in which tracks are alternately overlapped such as the tracks 221-4, 221-7, 221-5, 221-8, and 221-6, can be used. In the IMR method, after recording on the wide bottom tracks 221-4, 221-5, and 221-6, recording can be performed by overlapping the top tracks 221-7 and 221-8 interlaced with the bottom tracks 221-4, 221-5, and 221-6. As a result, track density is improved and higher recording capacity can be achieved. As the SMR method, a method in which tracks are sequentially overlapped such as the tracks 221-1, 221-2, and 221-3 is often mentioned. However, the IMR method, in which the tracks are alternately overlapped, can also be considered to record in overlapping parts of the tracks, so the IMR method can be considered to be provided in the SMR method.

As described above, in the illustrated SMR method, when data is recorded on the magnetic disk, recording is performed in overlapping parts of the adjacent tracks. In the IMR method, after recording on the bottom track, recording is performed on the interlaced top track by overlapping on the bottom track. As a result, the track density is improved and a higher recording capacity can be achieved.

Figure 3:
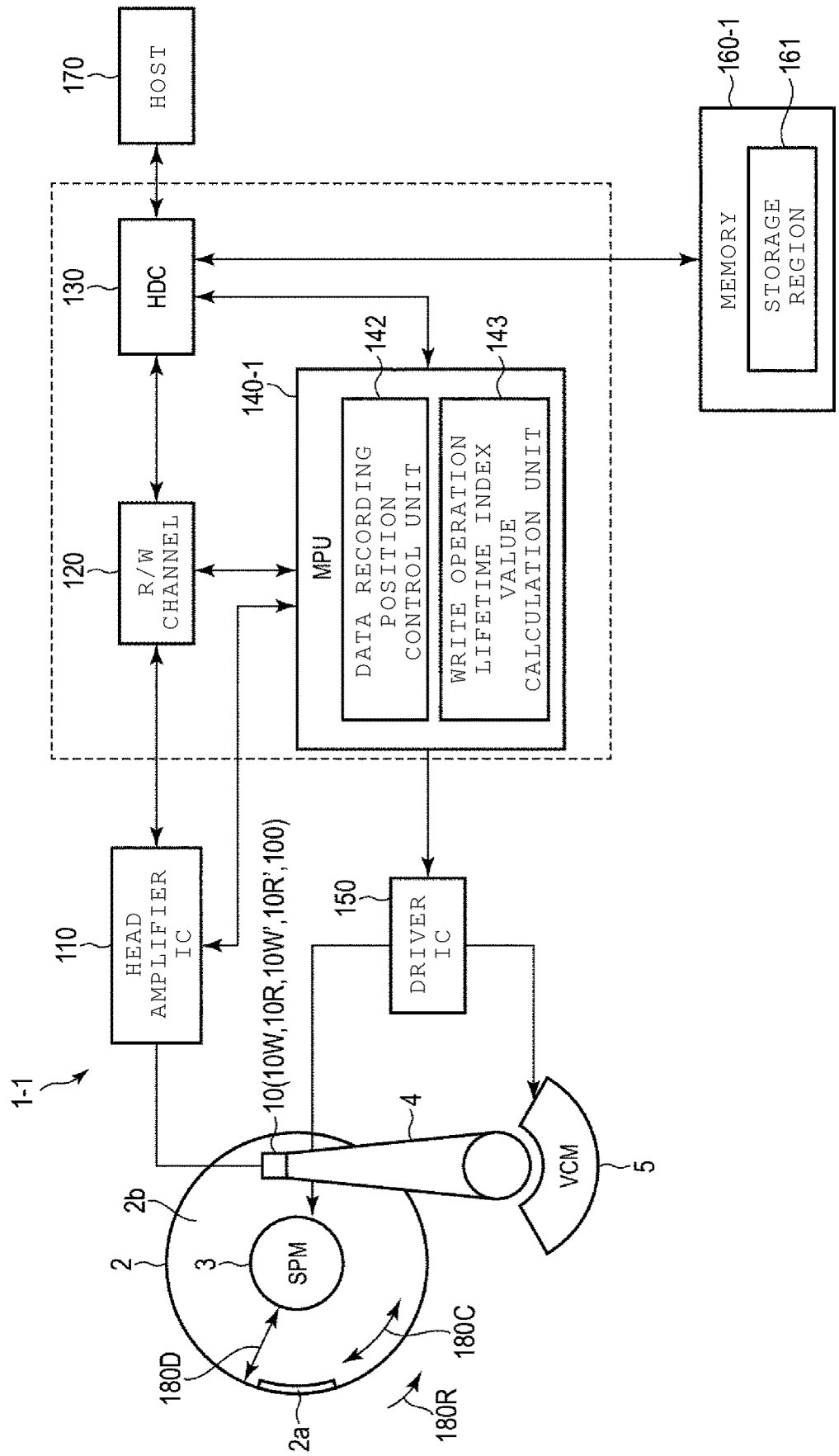
FIG. 3 is a block diagram illustrating a second magnetic recording/reproducing device according to the embodiment.

FIG. 3 illustrates a block diagram showing an example of a control configuration of a second magnetic recording/reproducing device according to the embodiment. A second magnetic recording/reproducing device 1-1 can have a control configuration similar to that of the first magnetic recording/reproducing device 1 of FIG. 1, except for using an MPU 140-1 instead of the MPU 140 and using a memory 160-1 instead of the memory 160. The MPU 140-1 is programmed with instructions to function as the data recording position control unit 142 for controlling the data recording position based on at least one of the assist power and the application time of the assist power when the assisted magnetic recording is performed by the first magnetic recording method or the second magnetic recording method, and is also programmed with instructions to function as a write operation lifetime index value calculation unit 143 for calculating a write operation lifetime index value related to the write operation lifetime based on the assist power and the application time of the assist power during recording by the magnetic head.

Here, "write operation lifetime" refers to a period during which recording operations can be performed repeatedly with sufficient recording quality. The write operation lifetime depends on the assist power and the assist power application time. For example, in the thermally-assisted magnetic recording method, the write operation lifetime depends on a magnitude of a laser power of a laser diode as the laser light source and a cumulative time of laser application. In the microwave-assisted magnetic recording method, the write operation lifetime depends on a current applied to the spin torque element and a cumulative time of current application.

The MPU 140 and the MPU 140-1 may optionally be provided with a control circuit (not illustrated) for changing the recording method to the first magnetic recording method or the second magnetic recording method. The memory 160-1 may further optionally include a storage region 161 for storing the write operation lifetime index value of the head or the medium during recording by the magnetic head. The data of the assist power and the assist power application time may be stored in the storage region 161, and may be obtained from the storage region 161 as needed. The write operation lifetime index value is a calculated value obtained by estimating the write operation lifetime, and may be calculated by the write operation lifetime index value calculation unit 143 based on the assist power and the assist power application time data. The data recording position control unit 142 may control the data recording position based on the write operation lifetime index value.

The write operation lifetime index value includes a head operation lifetime index value by the write operation of each assisted magnetic recording head, or a medium operation lifetime index value by the write operation of each region in the recording surface of the magnetic recording medium. The head operation lifetime may be shortened due to damage caused by heat generated by the assist element such as the near-field optical element or a spin torque oscillator. The medium operation lifetime may be reduced by damage to a protective film or a lubricating layer of the medium heated by the assist element. For example, in thermally-assisted magnetic recording, the medium recording layer is heated during recording, so there is a concern that the protective film and the lubricating layer of the magnetic disk may be thermally altered and destroyed by repeated recording. Then, the risk of contact between the recording head and the magnetic disk and the risk of contamination from the magnetic disk increase.

When the write operation lifetime index value is the head operation lifetime index value, the head can be changed based on the head operation lifetime index value. When the write operation lifetime index value is the medium operation lifetime index value, the recording region on the recording surface can be changed.

Figure 4:
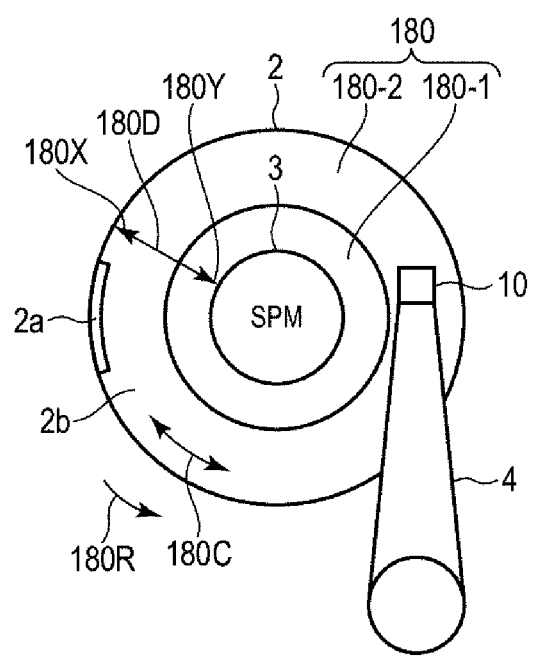
FIG. 4 is a diagram illustrating an example of a data recording position used in the embodiment.

FIG. 4 illustrates a diagram showing an example of the data recording position used in the embodiment. As illustrated in the drawing, 180 is a recording region on the recording surface 2b of the magnetic disk 2. The recording region 180 has, in the same recording surface 2b, a first region 180-1 having a first peripheral speed and a second region 180-2 having a second peripheral speed higher than the first peripheral speed. As illustrated in the drawing, for example, the data recording position can be designated in the second region 180-2. The second region 180-2 is provided further on a side in an outer direction represented by 180X than the first region 180-1, and has a high peripheral speed, so the data can be written by a conventional recording method suitable for recording with high access frequency, for example.

The first region 180-1 is provided further on a side in an inner direction represented by an arrow 180Y than the second region 180-2 and has a lower peripheral speed, so for example, when the data recording position is set to the first region 180-1, the data may be written by the shingled recording method suitable for recording data with low access frequency.

When the data recording position control unit 142 receives a write command for the conventional recording method to the first data recording position, the data recording position control unit 142 can change the first data recording position to the second data recording position having a second write operation lifetime index value higher than a first write operation lifetime index value.

When the data recording position control unit 142 receives a write command for the conventional recording method or the shingled recording method to the first data recording position, when using the shingled recording method, the data recording position control unit 142 performs a change to a third data recording position having a third write operation lifetime index value that is better than the first write operation lifetime index value of the first data recording position, whereas when using the conventional recording method, the data recording position control unit 142 performs a change to the second data recording position to be recorded with a head having the second write operation lifetime index value that is better than the third write operation lifetime index value of the head at the third data recording position.

First Example

Figure 5:
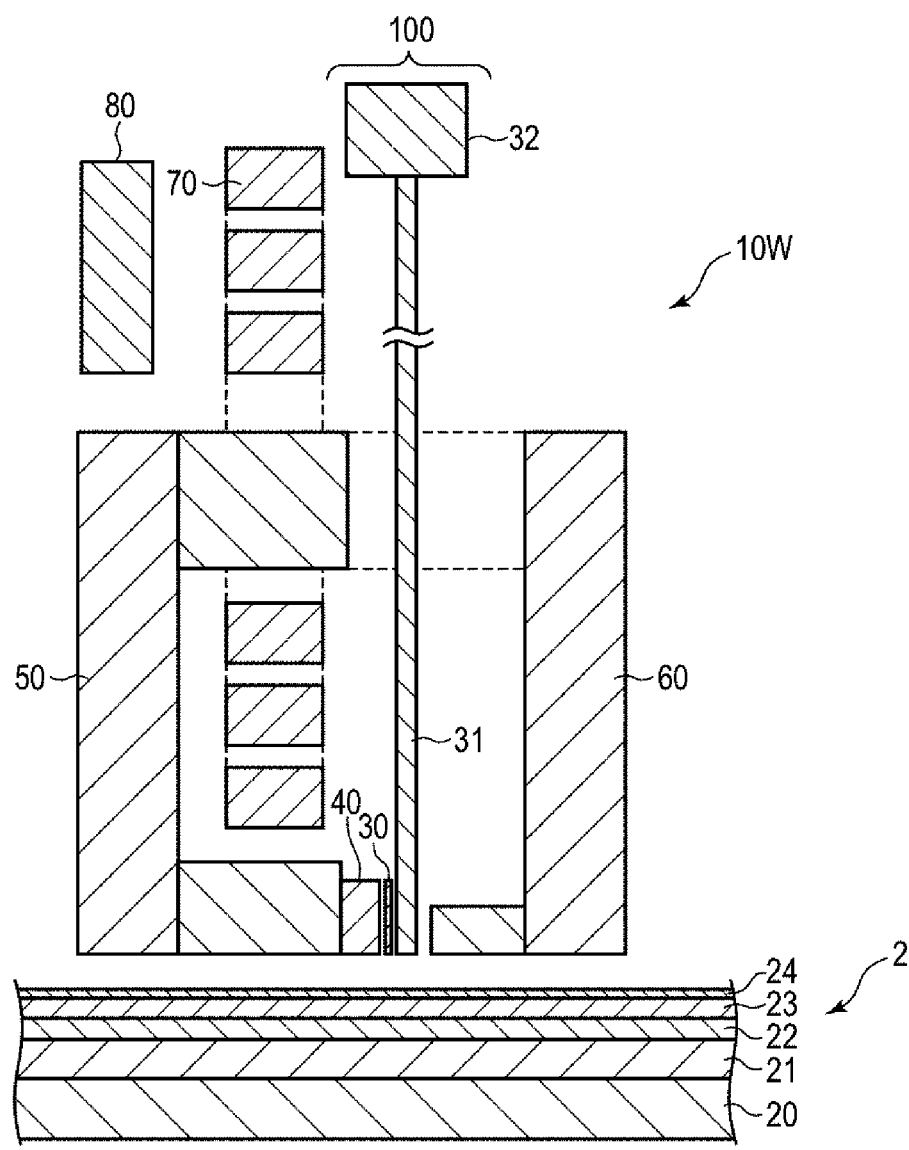
FIG. 5 is a lateral cross-sectional view of part of a first example of a magnetic recording/reproducing device according to the embodiment.

FIG. 5 is a lateral cross-sectional view of the write head 10W and the magnetic disk 2, which are part of the magnetic recording/reproducing device that can be used in an example of the thermally-assisted recording method. The magnetic disk 2 is a thermally-assisted recording type magnetic disk, and includes a substrate 20, and a heat sink layer 21, a crystal orientation layer 22, a perpendicular recording layer 23, and a protective film 24 stacked on the substrate 20 in order. The perpendicular recording layer 23 has a large anisotropy in a direction perpendicular to a disk surface. The crystal orientation layer 22 is placed below the perpendicular recording layer 23 to improve the orientation of the perpendicular recording layer 23. The heat sink layer 21 is placed below the crystal orientation layer 22 to limit the spread of the heated region. The protective film 24 is disposed on the perpendicular recording layer 23 to protect the perpendicular recording layer 23, and has a lubricant on its surface.

The magnetic head 10 is a separation type magnetic head in which a write head 10W and a read head 10R are separated. The write head 10W is configured with a main magnetic pole 40 made of a high permeability material that generates a magnetic field perpendicular to the disk surface, a trailing yoke 50 magnetically joined to a main magnetic pole for allowing magnetic flux to flow through the main magnetic pole 40, a return shield magnetic pole 60 disposed on a leading side of the main magnetic pole 40 and provided to effectively close a magnetic path immediately below the main magnetic pole, a coil 70 disposed to wrap around the magnetic path including the trailing yoke and the return shield magnetic pole for conducting magnetic flux to the main magnetic pole 40, a heater 80 for controlling a fly height of the recording head, a near-field optical element 30 that generates near-field light rays that heat the perpendicular recording layer 23 of the magnetic disk 2 on the leading side of the main magnetic pole 40, and a waveguide 31 for propagating light rays for generating near-field light rays. The light source is incorporated in the form of a laser diode 32 mounted on a slider of the actuator assembly 4. As the near-field optical element 30, for example, Au, Pd, Pt, Rh, or Ir, or an alloy made of some combination thereof can be used. As an insulating layer provided between the main magnetic pole and the near-field optical element, an oxide such as $SiO_2$ or $Al_2O_3$ can be used.

Figure 6:
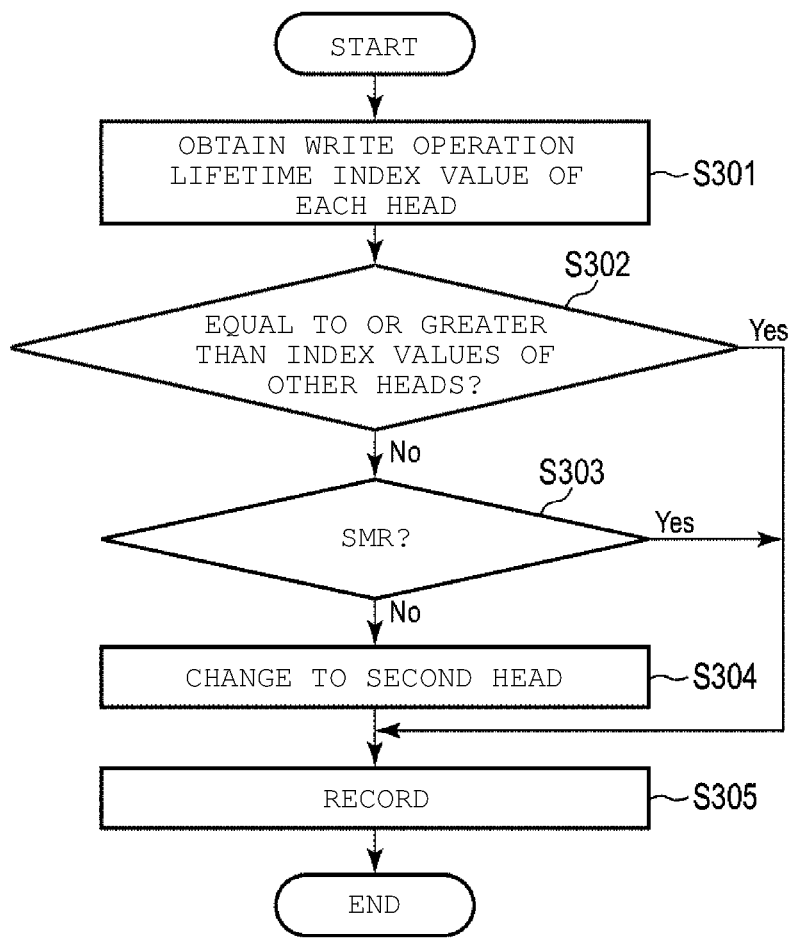
FIG. 6 is a flowchart illustrating an operation example of the magnetic recording/reproducing device according to the embodiment.

FIG. 6 illustrates a flowchart showing an operation example when the first magnetic recording/reproducing device of FIG. 1 is applied. In a first example, an example in which in the thermally-assisted magnetic recording/reproducing device, one assisted magnetic recording head out of a plurality of assisted magnetic recording heads is used and a head operation lifetime index value is used as the write operation lifetime index value will be described.

An operation example when the first magnetic recording/reproducing device of FIG. 1 is applied will be described below. A user issues a write command in the conventional recording method (CMR) or the shingled recording method (SMR). Upon receiving the command, the magnetic recording/reproducing device proceeds to the flow shown in FIG. 6. Before the recording operation, the write operation lifetime index value can be obtained from the memory 160 (S301). Here, the head operation lifetime index value may be obtained for each head 10. The write operation lifetime index value indicates the write operation lifetime calculated by the MPU 140 based on the magnitude of the laser power applied to the laser diode 32 and the accumulated time of laser power application. Relevant data used in the calculation may include, for example, recording current applied to the coil 70, heater power applied to the heater 80, and the like. Here, the write operation lifetime index value may be calculated and stored for each head as the head operation lifetime index value. The write operation lifetime index value also may be calculated and stored for each area of the magnetic disk as the medium operation lifetime index value.

The write operation lifetime index value is based on the head operation lifetime index value of 100 as a standard, and when the write operation is performed, the write operation lifetime index value decreases from 100 according to an operation situation, and when the write operation lifetime index value reaches 0, the write operation may be disabled.

Next, the MPU 140 determines whether the obtained write operation lifetime index value is equal to or greater than other write operation lifetime index values (S302). Here, it is determined whether the head operation lifetime index value of the first head is equal to or greater than the head operation lifetime index values of the other heads.

When the determination in S302 is Yes, recording is performed without changing the heads (S305). Here, recording is performed with the first head without changing the head. When the determination in S302 is No, it is checked whether the recording method is SMR or CMR. Here, it is determined whether the recording method is SMR (S303). When the determination in S303 is Yes, recording is performed with the first head without changing the head (S305). When the determination in S303 is No, that is, when the recording method is CMR, the MPU 140 controls the data recording position control unit 142 to change the head from the first head to the second head (S304). Here, the data recording position control unit 142 controls the head amplifier IC 110 to change the head from the first head to the second head. Finally, recording is performed with the changed head (S305), and the process ends.

Figure 7:
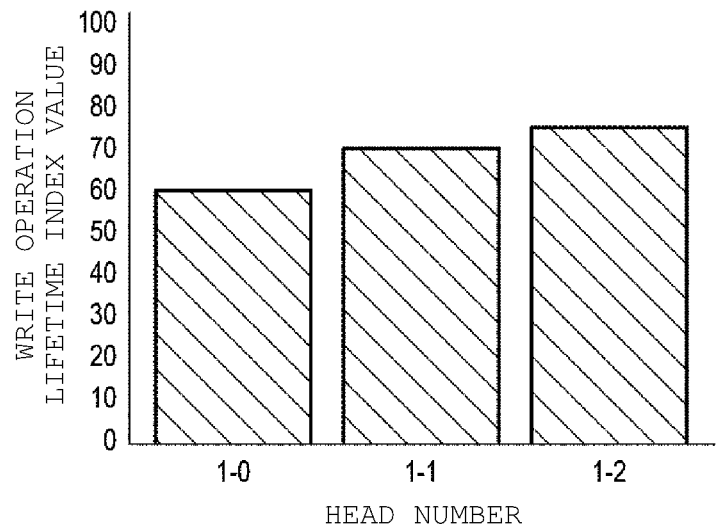
FIG. 7 is a graph illustrating an example of a write lifetime index value of each magnetic recording head.

FIG. 7 is a graph illustrating the write lifetime index value for each head of the magnetic recording/reproducing device including a plurality of magnetic recording heads. As illustrated in FIG. 7, the heads used in the first example have higher write operation lifetime index values in the order of head numbers 1-0, 1-1, and 1-2. The higher the write operation lifetime index value, the better the write operation lifetime. For example, when the head with head number 1-0 is used for recording by CMR, the write operation lifetime index value of head number 1-0 is determined to be less than the write operation lifetime index values of the other heads in the determination of S302. Here, the determination in S303 is No, and in S304, the head is changed. Here, head number 1-1 or 1-2 having a write operation lifetime index value higher than the write operation lifetime index value of head number 1-0 is selected as the second head.

The head can be changed by updating a map that links a logical address of a user data sector to a physical position of the magnetic recording/reproducing device. As an effect of the first example, when a write instruction for writing data with a high write access frequency such as CMR designates a head with a bad write operation lifetime index value, by changing to a different head with a good write operation lifetime index value, it is possible to reduce variations in the operation lifetime of the head and extend the lifetime of the device.

Second Example

Figure 8:
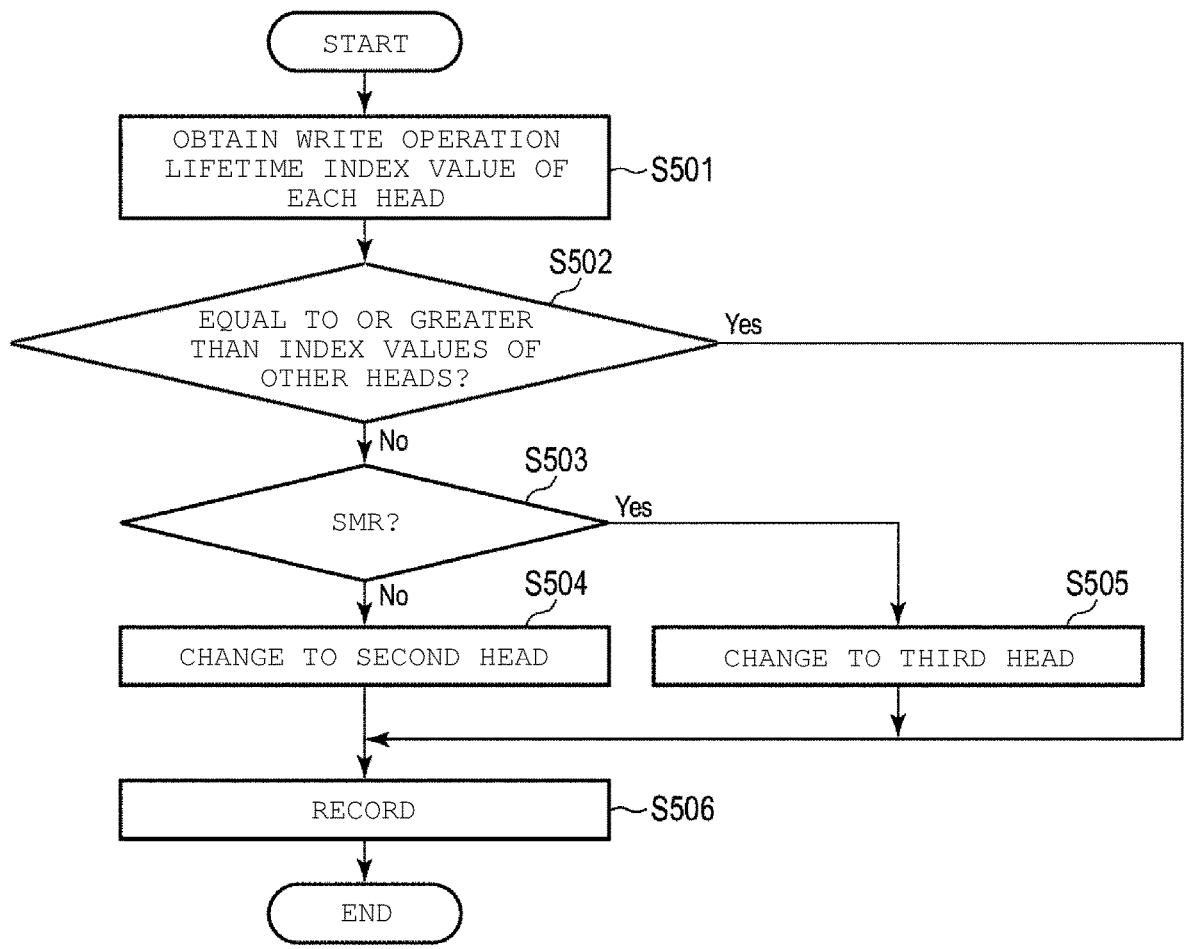
FIG. 8 is a flowchart illustrating another operation example of the magnetic recording/reproducing device according to the embodiment.

FIG. 8 illustrates a flowchart showing another operation example when the first magnetic recording/reproducing device of FIG. 1 is applied. In a second example, another example in which in the thermally-assisted magnetic recording/reproducing device, one assisted magnetic recording head out of a plurality of assisted magnetic recording heads is used and the head operation lifetime index value is used as the write operation lifetime index value will be described. A user issues a write command in the conventional recording method (CMR) or the shingled recording method (SMR). Upon receiving the command, the magnetic recording/reproducing device proceeds to the flow shown in FIG. 8.

Before the recording operation, a write operation lifetime index value may be obtained from the memory 160 (S501). Here, the head operation lifetime index value may be obtained for each head 10. The write operation lifetime index value may be calculated and stored in a similar manner as in the first example. Here, the write operation lifetime index value is based on the head operation lifetime index value of 100 as a standard, and when the write operation is performed, it decreases from 100 according to an operation situation, and when the write operation lifetime index value reaches 0, the write operation may be disabled.

Next, the MPU 140 determines whether the obtained write operation lifetime index value is equal to or greater than other write operation lifetime index values (S502). Here, it is determined whether the head operation lifetime index value of the first head is equal to or greater than the write operation lifetime index values of the other heads. When the determination in S502 is Yes, recording is performed without changing the head (S505). Here, without changing the head, recording is performed with the first head (S506). When the determination in S502 is No, it is checked whether the recording method is SMR or CMR. Here, it is determined whether it is SMR (S503). When the determination in S503 is No, that is, when the recording method is CMR, the MPU 140 controls the data recording position control unit 142 to change the head from the first head to the second head (S504). Here, the data recording position control unit 142 controls the head amplifier IC 110 to change the head from the first head to the second head. When the determination in S503 is Yes, that is, when the recording method is SMR, the data recording position control unit 142 performs control to change the head from the first head to the third head (S505). Here, the data recording position control unit 142 controls the head amplifier IC 110 to change the head from the first head to the third head.

As the third head, a head having a write operation lifetime index value better than the write operation lifetime index value of the first head that performs the recording operation is selected. As the second head, a head having a write operation lifetime index value higher than the write operation lifetime index value of the third head that performs the recording operation is selected (S504, S505). Finally, recording is performed with the changed head (S506), and the process ends.

Figure 9:
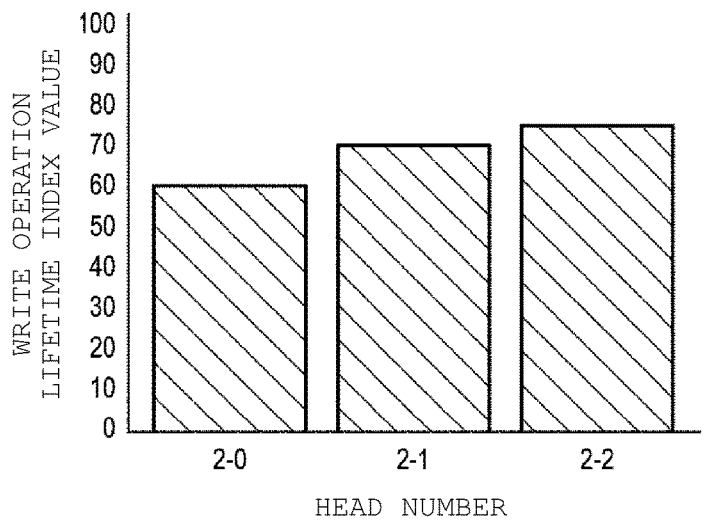
FIG. 9 is a graph illustrating an example of the write lifetime index value of each magnetic recording head.

FIG. 9 is a graph illustrating the write lifetime index value of each head of the magnetic recording/reproducing device including a plurality of magnetic recording heads. As illustrated in FIG. 9, the heads used in the second example have higher head lifetime index values as write operation lifetime index values in the order of head numbers 2-0, 2-1, and 2-2. For example, when using a head with the head number 2-0 is used for recording by CMR, the write operation lifetime index value of the head number 2-0 is determined in S502 to be less than the write operation lifetime index values of other heads, the head numbers 2-1 and 2-2. The determination in S503 is No, and in S504, the data recording position control unit 142 performs control to change from the first head to the second head. When the determination in S503 is Yes and it is SMR, the data recording position control unit 142 performs control to change the head from the first head to the third head.

A head with the head number 2-1, which has a better write operation lifetime index value than the write operation lifetime index value of the first head, which is the head with the head number 2-0, is selected as the third head. A head with the head number 2-2, which has a write operation lifetime index value higher than the write operation lifetime index value of the third head, is selected as the second head. It is possible to change the head by updating the map that links the logical address of the user data sector to the physical position of the magnetic recording/reproducing device.

As an effect of the second example, when a write instruction for writing data with a high write access frequency such as CMR designates a head with a poor write operation lifetime index value, by changing the head to a different head with a good write operation lifetime index value, it is possible to reduce variations in the operation lifetime of the head and extend the lifetime of the device.

Third Example

Figure 10:
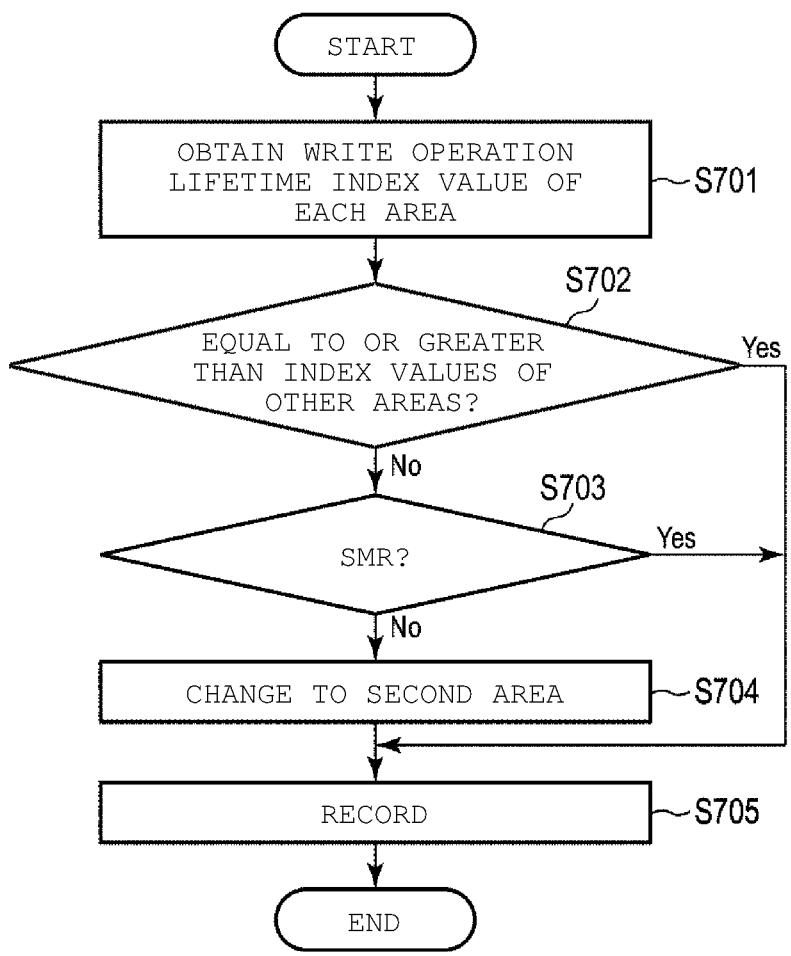
FIG. 10 is a flow diagram illustrating still another operation example of the magnetic recording/reproducing device according to the embodiment.

FIG. 10 illustrates a flowchart showing still another operation example when the first magnetic recording/reproducing device of FIG. 1 is applied. In a third example, an example in which in the thermally-assisted magnetic recording/reproducing device, the data recording position is set to a predetermined area in the recording surface of the magnetic recording medium and the medium operation lifetime index value is used as the write operation lifetime index value will be described. A user issues a write command in the conventional recording method (CMR) or the shingled recording method (SMR). Upon receiving the command, the magnetic recording/reproducing device proceeds to the flowchart shown in FIG. 10.

Before the recording operation, the write operation lifetime index value may be obtained from the memory 160 (S701). Here, the medium operation lifetime index value may be obtained for each area of one recording surface. The write operation lifetime index value indicates the write operation lifetime calculated by the MPU 140 based on the magnitude of the laser power applied to the laser diode 32 and the accumulated time of laser power application. Relevant data used in the calculation may include, for example, recording current applied to the coil 70, heater power applied to the heater 80, and the like. Here, the write operation lifetime index value may be calculated and stored for each area of the magnetic disk as the medium operation lifetime index value. The write operation lifetime index value is based on the medium operation lifetime index value of 100 as a standard, and when the write operation is performed, the write operation lifetime index value decreases from 100 according to an operation situation, and when the write operation lifetime index value reaches 0, the write operation may be disabled.

Next, the MPU 140 determines whether the obtained write operation lifetime index value is equal to or greater than other write operation lifetime index values (S702). Here, it is determined whether the obtained medium operation lifetime index value of the first area of the magnetic disk is equal to or greater than the medium operation lifetime index values of the other areas. When the determination in S702 is Yes, recording is performed without changing the data recording position (S705). Here, recording is performed in the first area without changing the area. When the determination in S702 is No, it is checked whether the recording method is SMR or CMR. Here, it is determined whether it is SMR (S703). When the determination in S703 is Yes, recording is performed in the first area without changing the area (S705). When the determination in S703 is No, that is, when the recording method is CMR, the MPU 140 controls the data recording position control unit 142 to change the data recording position from the first area to the second area (S704). Here, the data recording position control unit 142 controls the head amplifier IC 110 to change the data recording position from the first area to the second area. Finally, recording is performed in the changed area (S305), and the process ends.

Figure 11:
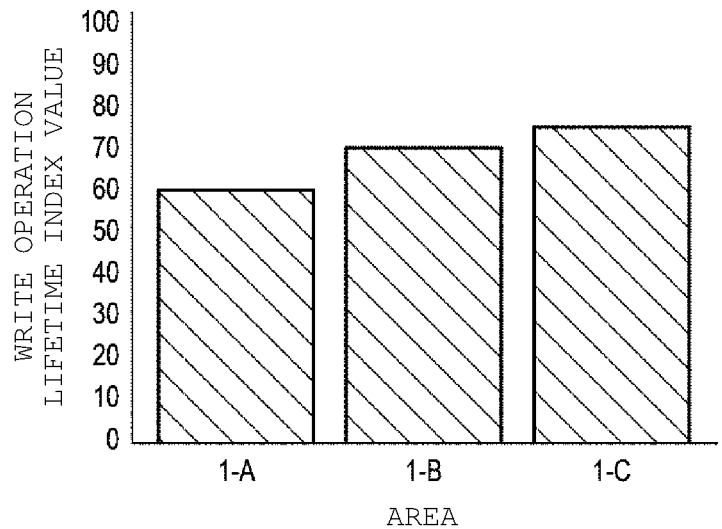
FIG. 11 is a graph illustrating a write lifetime index value of each area.

FIG. 11 is a graph illustrating the write lifetime index value of each area on the recording surface of the magnetic disk. As illustrated in the drawing, the heads used in the third example have higher write operation lifetime index values in the order of an area 1-A, an area 1-B, and an area 1-C. For example, when the area 1-A is used for recording by CMR, the medium operation lifetime index value of the area 1-A is determined to be less than the medium operation lifetime index values of other areas in the determination of S702. Here, the determination in S703 is No, and in S704, the data recording position control unit 142 changes the area. Here, the area 1-B or the area 1-C having a medium operation lifetime index value higher than the medium operation lifetime index value of the area 1-A is selected as the second area.

The data recording position may be changed by updating the map that links the logical address of the user data sector to the physical position of the magnetic recording/reproducing device. As an effect of the third example, when a write instruction for writing data with a high write access frequency such as CMR designates an area with a poor write operation lifetime index value, by changing the data recording position to a different area with a good write operation lifetime index value, it is possible to reduce the variation in the operation lifetime of each area of the magnetic disk and extend the lifetime of the device.

Fourth Example

Figure 12:
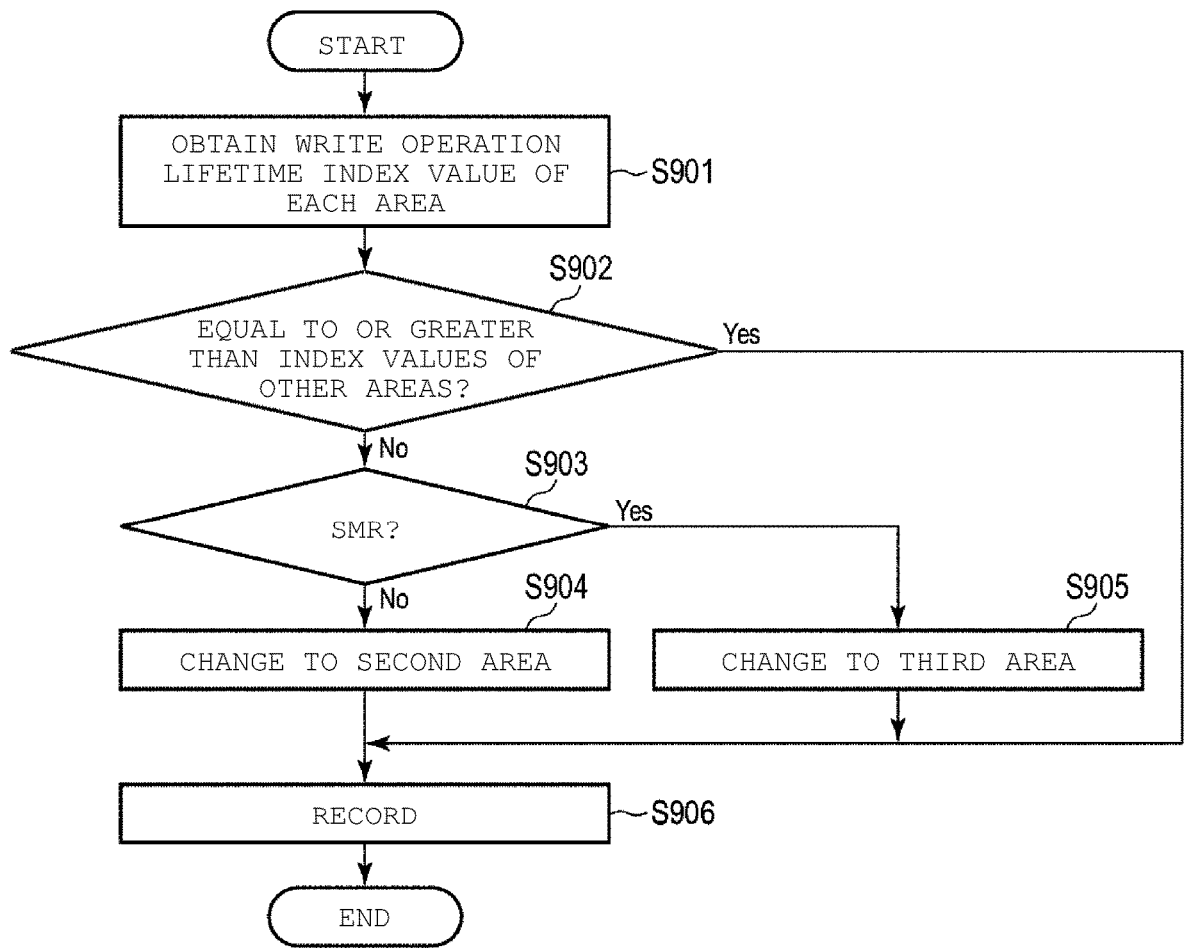
FIG. 12 is a flow diagram illustrating still another operation example of the magnetic recording/reproducing device according to the embodiment.

FIG. 12 illustrates a flowchart showing still another operation example when the first magnetic recording/reproducing device of FIG. 1 is applied. In a fourth example, another example in which in the thermally-assisted magnetic recording/reproducing device, the data recording position is set to a predetermined area in the recording surface of the magnetic recording medium and the medium operation lifetime index value is used as the write operation lifetime index value will be described.

A user issues a write command in the conventional recording method (CMR) or the shingled recording method (SMR). Upon receiving the command, the magnetic recording/reproducing device proceeds to the flow shown in FIG. 12. Before the recording operation, a write operation lifetime index value may be obtained from the memory 160 (S901). Here, the medium operation lifetime index value may be obtained for each area of one recording surface. The write operation lifetime index value may be calculated and stored in a similar manner as in the third example. Here, the write operation lifetime index value is based on the medium operation lifetime index value of 100 as a standard, and when the write operation is performed, the write operation lifetime index value decreases from 100 according to an operation situation, and when the medium operation lifetime index value reaches 0, the write operation may be disabled.

Next, the MPU 140 determines whether the obtained write operation lifetime index value is equal to or greater than other write operation lifetime index values (S902). Here, the MPU 140 determines whether the obtained medium operation lifetime index value of the first area of the magnetic disk is equal to or greater than the medium operation lifetime index values of the other areas. When the determination in S902 is Yes, recording is performed without changing the data recording position (S905). Here, without changing the area, recording is performed in the first area (S906). When the determination in S902 is No, it is checked whether the recording method is SMR or CMR. Here, it is determined whether it is SMR (S903). When the determination in S903 is No, that is, when the recording method is CMR, the data recording position control unit 142 controls the head amplifier IC 110 to change the data recording position from the first area to the second area (S904). When the determination in S903 is Yes, that is, when the recording method is SMR, the data recording position control unit 142 changes the data recording position from the first area to the third area (S905).

As the third area, an area having a write operation lifetime index value better than the write operation lifetime index value of the first area is selected. As the second area, an area having a write operation lifetime index value higher than the write operation lifetime index value of the third area is selected (S904, S905). Finally, recording is performed in the changed area (S906), and the process ends.

Figure 13:
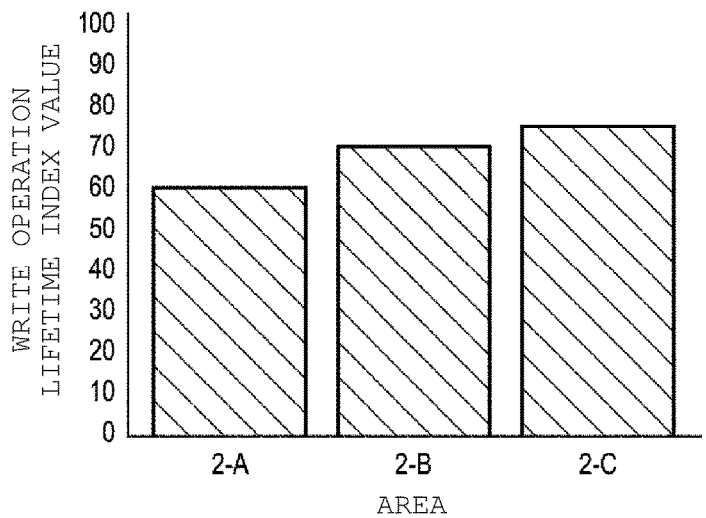
FIG. 13 is a graph illustrating the write lifetime index value of each area.

FIG. 13 is a graph illustrating the write lifetime index value of each area of the magnetic recording/reproducing device including a plurality of magnetic recording heads. As illustrated in FIG. 13, in the magnetic disk used in the fourth example, the media lifetime index value as the write operation lifetime index value increases in the order of areas 2-A, 2-B, and 2-C in the recording surface.

For example, when using the area 2-A for recording by CMR, the write operation lifetime index value of the area 2-A is determined to be less than the write operation lifetime index values of the other areas 2-B and 2-C in the determination of S902. The determination in S903 is No, and in S904, the data recording position control unit 142 performs control to change from the first area to the second area. When the determination in S903 is Yes and it is SMR, the data recording position control unit 142 performs control to change from the first area to the third area.

The area 2-B having a write operation lifetime index value higher than the write operation lifetime index value of the first area, which is the area 2-A, is selected as the third area. The area 2-C having a write operation lifetime index value higher than the write operation lifetime index value of the third area is selected as the second area.

The data recording position may be changed by updating the map that links the logical address of the user data sector to the physical position of the magnetic recording/reproducing device. As an effect of the fourth example, when a write instruction for writing data with a high write access frequency such as CMR designates an area with a poor write operation lifetime index value, by changing the data recording position to a different area with a good write operation lifetime index value, it is possible to reduce the variation in the operation lifetime of each area of the magnetic disk and extend the lifetime of the device.

Fifth Example

Figure 14:
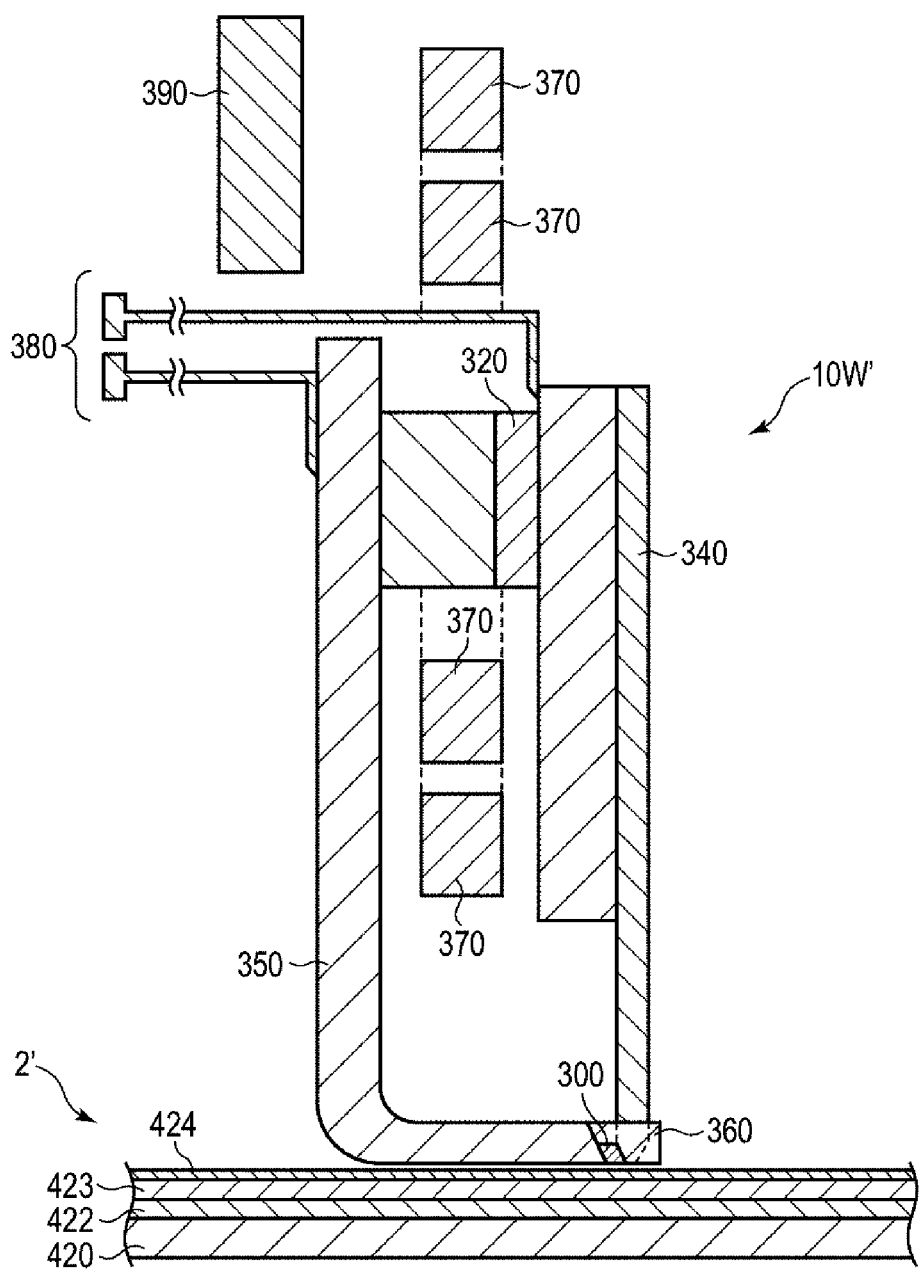
FIG. 14 is a partial lateral cross-sectional view of a fifth example of the magnetic recording/reproducing device according to the embodiment.

FIG. 14 is a lateral cross-sectional view of a write head 10W' of a magnetic head and a magnetic disk 2' that are part of the magnetic recording/reproducing device that can be used in an example of a high-frequency assisted recording method.

Figure 15:
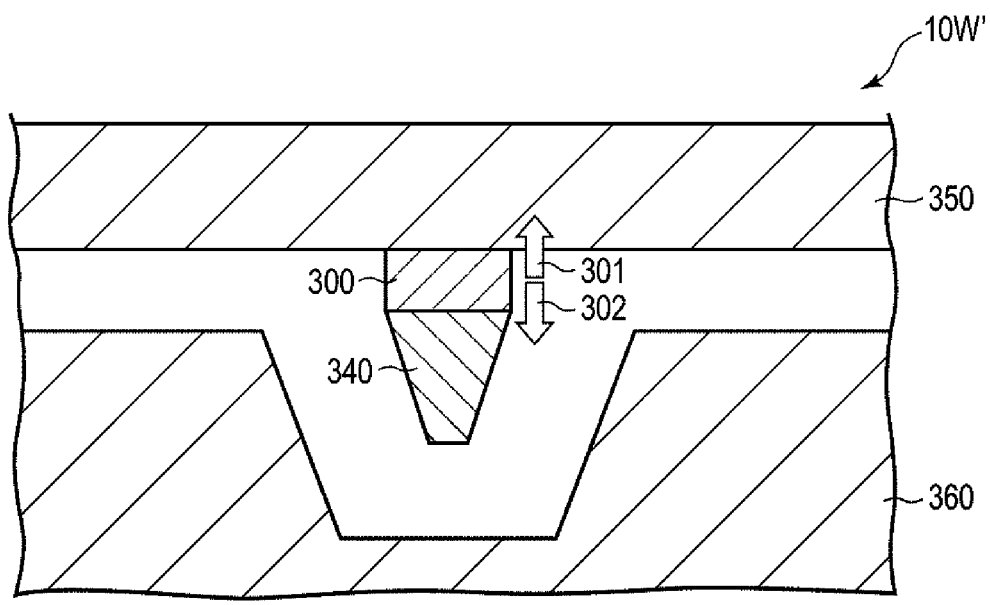
FIG. 15 is a view of a recording head portion of FIG. 14 as seen from an ABS surface.

FIG. 15 illustrates a view of a recording head portion of FIG. 14 viewed from an ABS surface. As illustrated in the drawing, the magnetic disk 2' is a perpendicular double-layer film medium including a soft magnetic layer 422 on a substrate 420, and a perpendicular recording layer 423 having anisotropy in a direction perpendicular to a disk surface on an upper layer part. A protective layer 424 is provided on the perpendicular recording layer 423.

The magnetic head 10 is a separation type magnetic head in which the write head 10W' and a read head 10R' are separated. The write head unit 10W' includes a main magnetic pole 340 made of a high-permeability material that generates a magnetic field perpendicular to a disk surface, a heater 390 for controlling a fly height of the write head 10W', a write shield magnetic pole 350 provided to efficiently close a magnetic path via the soft magnetic layer 422 immediately below the main magnetic pole 340 of a vertical magnetic head disposed on a trailing side of the main magnetic pole 340, a side shield 360 made of a high magnetic permeability material physically separated on an ABS surface from the main magnetic pole 340 on both sides of the main magnetic pole 340 in a track width direction, and a coil 370 disposed to wrap around a magnetic path including the main magnetic pole 340 and the write shield magnetic pole 350 for conducting magnetic flux to the main magnetic pole 340.

A spin torque element 300 is disposed between a tip of the main magnetic pole 340 and the write shield magnetic pole 350 and that functions as a microwave assist element 100'. The spin torque element 300 has a layered structure of magnetic and non-magnetic materials. An electrically insulating layer 320 is disposed at a joint portion between the main magnetic pole 340 and the write shield magnetic pole 350 as illustrated in FIG. 14, and the portions insulated from each other are respectively electrically connected to drive terminal electrodes 380. As a result, the write shield magnetic pole 350 and the main magnetic pole 340 act as electrodes for vertically energizing the spin torque element 300.

As illustrated in FIG. 15, oscillation of the spin torque element 300 occurs when magnetization of the element 300 rotates at a natural oscillation period due to balance between a gap magnetic field applied to the element 300 and a spin injection force. The gap magnetic field changes depending on recording current flowing through the coil of the magnetic head. Since the gap magnetic field increases as the recording current increases, it is necessary to increase the voltage applied to the spin torque element 300 to balance the spin injection force.

Since heat is generated in the spin torque element 300 when a voltage is applied to the spin torque element 300, repeated recording tends to accumulate damage to the spin torque element 300, eventually resulting in insufficient oscillation of the spin torque element 300 leading to deterioration in recording quality. The write operation lifetime depends on the magnitude of the voltage applied to the spin torque element 300 and the cumulative application time.

In a fifth example, an example in which in a high-frequency assisted magnetic recording/reproducing device, one assisted magnetic recording head out of a plurality of assisted magnetic recording heads is used and the head operation lifetime index value is used as the write operation lifetime index value will be described. An operation example of the high-frequency assisted magnetic recording/reproducing device of the fifth example is similar to that of the first example except that the assisted magnetic recording head for high-frequency assisted magnetic recording is used instead of the assisted magnetic recording head for thermally assisted magnetic recording/reproducing device, and the operation example can be illustrated by the flowchart of FIG. 6.

Figure 16:
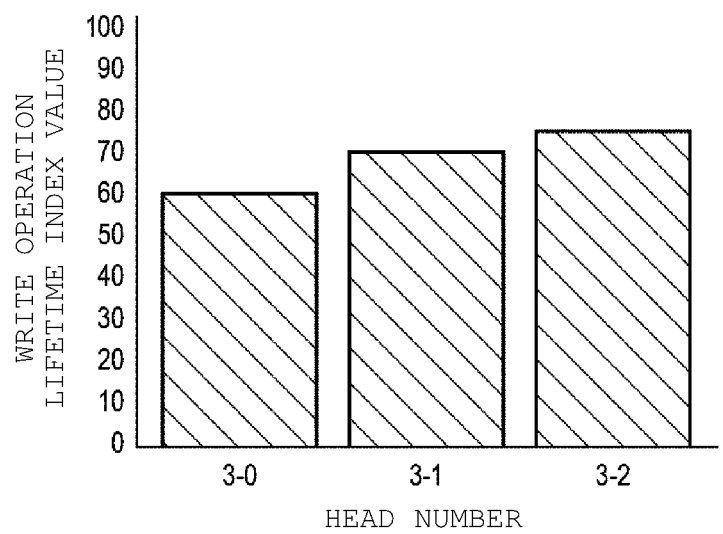
FIG. 16 is a graph illustrating a write lifetime index value of each head.

FIG. 16 is a graph illustrating a write lifetime index value of each head of the high-frequency assisted magnetic recording/reproducing device. As illustrated in FIG. 16, the heads used in the fifth example have higher write operation lifetime index values in the order of head numbers 3-0, 3-1, and 3-2. The higher the write operation lifetime index value, the better the write operation lifetime.

For example, when the head with the head number 3-0 is used for recording by CMR, the write operation lifetime index value of the head number 3-0 is determined to be less than the write operation lifetime index values of the other heads in the determination of S302. Here, the determination in S303 is No, and in S304, the data recording position control unit 142 performs control to change the head. Here, the head of the head number 3-1 or 3-2 having a write operation lifetime index value higher than the write operation lifetime index value of the head number 3-0 is selected.

The head may be changed by updating the map that links the logical address of the user data sector with the physical position of the magnetic recording/reproducing device.

As an effect of the fifth example, when a write instruction for writing data with a high write access frequency such as CMR designates a head with a bad write operation lifetime index value, by changing to a different head with a good write operation lifetime index value, it is possible to reduce variations in the operation lifetime of the head and extend the lifetime of the device.

Although the write operation index value is calculated based on both the assist power and the assist power application time in the above-described examples, the write operation index value may be based on either one of the assist power and the assist power application time.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic recording/reproducing device comprising:
 a magnetic recording medium;
 a plurality of assisted magnetic recording heads; and
 a processor configured to write data onto the magnetic recording medium according to a first type of magnetic recording or a second type of magnetic recording and select one of the assisted magnetic recording heads for recording based on at least one of assist power and application time of the assist power when assisted magnetic recording is performed, wherein
 in response to receiving a first write command that is to be carried out according to a shingled magnetic recording method with an assisted magnetic recording head having a first write operation lifetime index value, the processor changes the assisted magnetic recording head to one of the assisted magnetic recording heads having a second write operation lifetime index value higher than the first write operation lifetime index value, and
 in response to receiving a second write command that is to be carried out according to a conventional magnetic recording method with the assisted magnetic recording head having the first write operation lifetime index value, the processor changes the assisted magnetic recording head to one of the assisted magnetic recording heads having a third write operation lifetime index value higher than the second write operation lifetime index value.

2. The magnetic recording/reproducing device according to claim 1, wherein the processor is further configured to:
 calculate for each of the assisted magnetic recording heads a write operation lifetime index value related to a write operation lifetime based on the assist power and the assist power application time, and
 select one of the assisted magnetic recording heads for recording based on the write operation lifetime index values.

3. The magnetic recording/reproducing device according to claim 1, wherein
 the first type of magnetic recording is the conventional magnetic recording method in which recording is performed on tracks adjacent in a radial direction at intervals, and the second type of magnetic recording is the shingled magnetic recording method in which recording is performed on tracks adjacent in the radial direction that are overlapped or an interlace magnetic recording method in which recording is performed on tracks adjacent in the radial direction that are alternately overlapped.

4. The magnetic recording/reproducing device according to claim 1, wherein
 the magnetic recording medium has a first region that is rotated at a first peripheral speed and a second region that is rotated at a second peripheral speed faster than the first peripheral speed, and
 the assisted recording head is set to record according to the conventional magnetic recording method when data is to be written in the second region.

5. The magnetic recording/reproducing device according to claim 1, wherein
 the magnetic recording medium has a first region that is rotated at a first peripheral speed and a second region that is rotated at a second peripheral speed faster than the first peripheral speed, and
 the assisted recording head is set to record according to the shingled magnetic recording method when data is to be written in the first region.

6. The magnetic recording/reproducing device according to claim 1, wherein the assisted magnetic recording heads each include a thermal assist element and the assisted magnetic recording is a thermal-assisted magnetic recording.

7. The magnetic recording/reproducing device according to claim 1, wherein the assisted magnetic recording heads each include a microwave assist element and the assisted magnetic recording is a microwave-assisted magnetic recording.

8. A magnetic recording/reproducing device comprising:
 a magnetic recording medium;
 an assisted magnetic recording head; and
 a processor configured to write data onto the magnetic recording medium in one of a plurality of areas according to a first type of magnetic recording or a second type of magnetic recording and select one of the areas for recording based on at least one of assist power and application time of the assist power when assisted magnetic recording is performed, wherein
 in response to receiving a first write command that is to be carried out according to a shingled magnetic recording method in an area having a first medium operation lifetime index value, the processor changes the area for recording to one having a second medium operation lifetime index value higher than the first medium operation lifetime index value, and
 in response to receiving a second write command that is to be carried out according to a conventional magnetic recording method in the area having the first medium operation lifetime index value, the processor changes the area for recording to one having a third medium operation lifetime index value higher than the second medium operation lifetime index value.

9. The magnetic recording/reproducing device according to claim 8, wherein the processor is further configured to:
  calculate for each of the areas a medium operation lifetime index value related to a medium operation lifetime based on the assist power and the assist power application time, and
  select one of the areas for recording based on the medium operation lifetime index values.

10. The magnetic recording/reproducing device according to claim 9, wherein
  the first type of magnetic recording is the conventional magnetic recording method in which recording is performed on tracks adjacent in a radial direction at intervals, and the second type of magnetic recording is the shingled magnetic recording method in which recording is performed on tracks adjacent in the radial direction that are overlapped or an interlace magnetic recording method in which recording is performed on tracks adjacent in the radial direction that are alternately overlapped.

11. The magnetic recording/reproducing device according to claim 8, wherein
  the magnetic recording medium has a first region that is rotated at a first peripheral speed and a second region that is rotated at a second peripheral speed faster than the first peripheral speed, and
  the assisted recording head is set to record according to the conventional magnetic recording method when data is to be written in the second region.

12. The magnetic recording/reproducing device according to claim 8, wherein
  the magnetic recording medium has a first region that is rotated at a first peripheral speed and a second region that is rotated at a second peripheral speed faster than the first peripheral speed, and
  the assisted recording head is set to record according to the shingled magnetic recording method when data is to be written in the first region.

13. The magnetic recording/reproducing device according to claim 8, wherein the assisted magnetic recording head includes a thermal assist element and the assisted magnetic recording is a thermal-assisted magnetic recording.

14. The magnetic recording/reproducing device according to claim 8, wherein the assisted magnetic recording head includes a microwave assist element and the assisted magnetic recording is a microwave-assisted magnetic recording.

15. A method of recording data onto a magnetic recording medium of a magnetic recording/reproducing device having a plurality of assisted magnetic recording heads, said method comprising:
  calculating for each of the assisted magnetic recording heads a write operation lifetime index value related to a write operation lifetime based on an assist power and application time of the assist power when assisted magnetic recording is performed; and
  in response to a write command, selecting one of the assisted magnetic recording heads for recording based on the write operation lifetime index values and a type of magnetic recording method, wherein
  in response to receiving a first write command that is to be carried out according to a shingled magnetic recording method with an assisted magnetic recording head having a first write operation lifetime index value, the assisted magnetic recording head is changed to one of the assisted magnetic recording heads having a second write operation lifetime index value higher than the first write operation lifetime index value, and
  in response to receiving a second write command that is to be carried out according to a conventional magnetic recording method with the assisted magnetic recording head having the first write operation lifetime index value, the assisted magnetic recording head is changed to one of the assisted magnetic recording heads having a third write operation lifetime index value higher than the second write operation lifetime index value.

16. The method of claim 15, wherein
  the type of magnetic recording method is one of the conventional magnetic recording method, the shingled magnetic recording method, and an interlaced magnetic recording method, and
  the assisted magnetic recording is one of a thermal-assisted magnetic recording and a microwave-assisted magnetic recording.

* * * * *